Nov. 18, 1941.    H. F. KURTZ    2,263,341
OPTICAL INSTRUMENT
Filed May 7, 1941    3 Sheets-Sheet 1

HENRY F. KURTZ
INVENTOR
BY
ATTORNEYS

Nov. 18, 1941.   H. F. KURTZ   2,263,341
OPTICAL INSTRUMENT
Filed May 7, 1941   3 Sheets-Sheet 2

HENRY F. KURTZ
INVENTOR
BY
ATTORNEYS

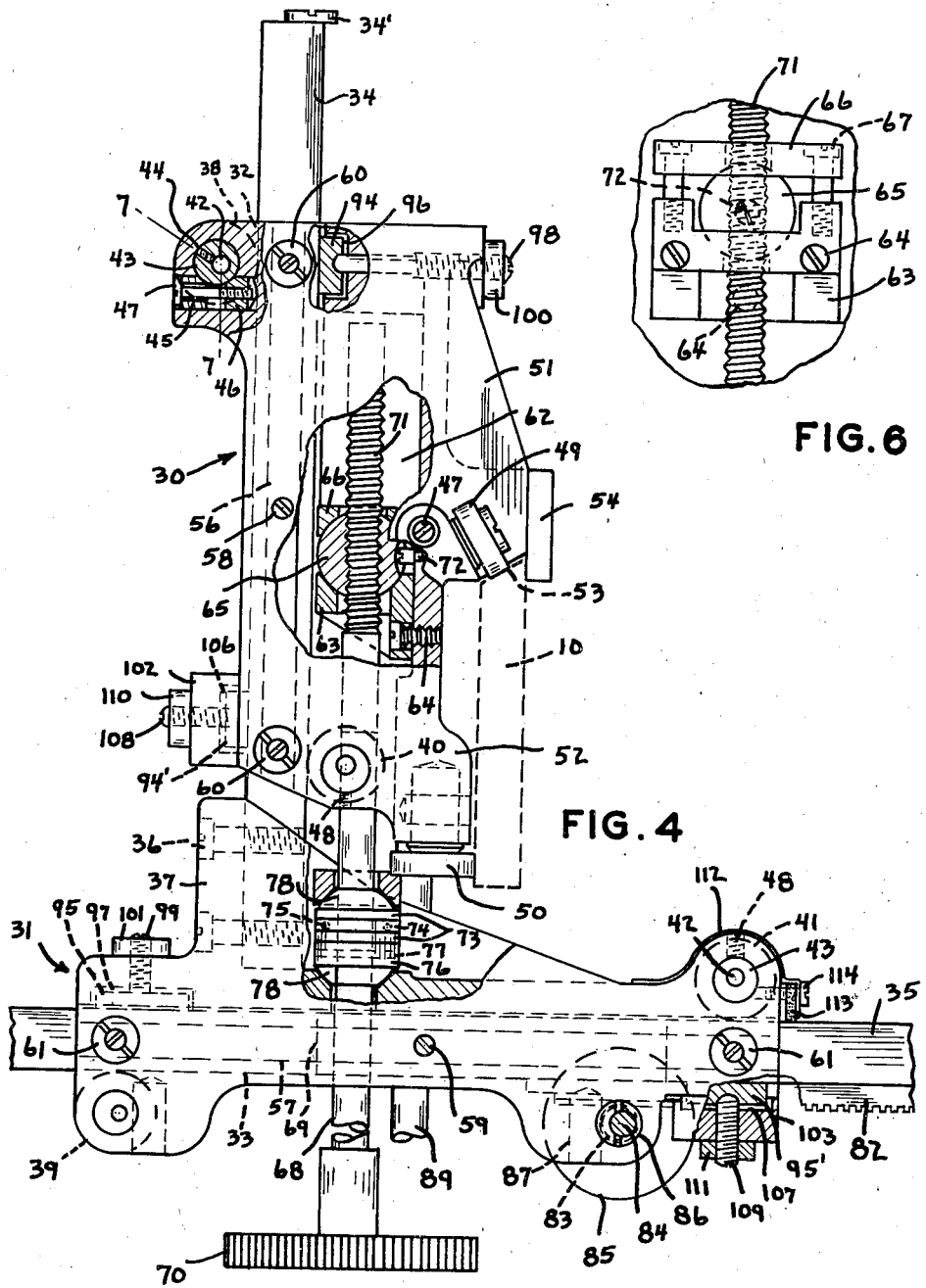

Patented Nov. 18, 1941

2,263,341

UNITED STATES PATENT OFFICE 2,263,341

OPTICAL INSTRUMENT

Henry F. Kurtz, Rochester, N. Y., assignor to Bausch & Lomb Optical Company, Rochester, N. Y., a corporation of New York Application May 7, 1941, Serial No. 392,304

8 Claims. (Cl. 88—24)

The invention relates to optical instruments and more especially is concerned with an optical instrument of a novel design having novel means for positioning the optical system of the instrument.

It is necessary in certain optical instruments to mount the optical system thereof for adjustable movement along two or more axes located in different planes. Where such is the case, usual practice employs several slide blocks, each provided with a guideway in which a slide is movably mounted. These slides are angularly disposed to each other and one of them is adapted to have the housing for the optics of the instrument mounted thereon.

In general, slides for this purpose are of the dovetail type and are characterized in that each slide and its guideway must be carefully finished by expensive and tedious grinding and polishing operations to produce an instrument capable of precision work. The accuracy with which these slides and guideways must be machined will be appreciated when it is considered that in many instances a maximum of only five minutes tolerance is allowed for the angle between two slides. Slides of this nature, even when well adjusted, are apt to operate stiffly since they have a tendency to bind in their guideways due to the bending moment created by the weight of the optical system and its housing which they carry and also because a dovetail type of mounting makes them subject to considerable break-out friction.

It is an object of my invention to provide an optical instrument designed to overcome those disadvantages and defects present in analogous prior art structure and also to provide novel means in an instrument for adjusting the position of the optical system thereof.

Another object resides in the utilization of special bearing means for supporting the slides of the adjustment mechanism for the housing which carries the optics of an optical instrument whereby to provide easy operation and to eliminate break-out friction in the mechanism.

My invention has as a further object the provision of an optical instrument wherein the slides for the positioning mechanism of its optical system may be adjusted to and held at a desired angle with respect to each other.

Yet a further object of my invention resides in providing an optical instrument, the optical system of which is adjustably movable along any one of three coordinate axes by mechanism of a simple design which readily lends itself to inexpensive construction and fabrication.

With these and other objects in view which may be incident to my improvements, the invention consists in the parts and combinations to be hereinafter set forth and claimed, with the understanding that the several necessary elements comprising my invention may be varied in construction, proportion and arrangement without departing from the spirit of the invention or exceeding the scope of the appended claims.

In order to make my invention more clearly understood, I have shown in the accompanying drawings means for carrying the same into practical effect without limiting the improvements in their useful applications to the particular constructions which, for the purpose of explanation have been made the subject of illustration. To this end the invention is disclosed in the following manner, wherein:

Figure 4 is a side elevation, with certain parts in section, of the means for adjusting the position of the optical system of the instrument of Figures 1 and 2.

Figure 6 is a detail partial elevation of the operating means for one of the slides shown in Figure 4.

Figure 1:
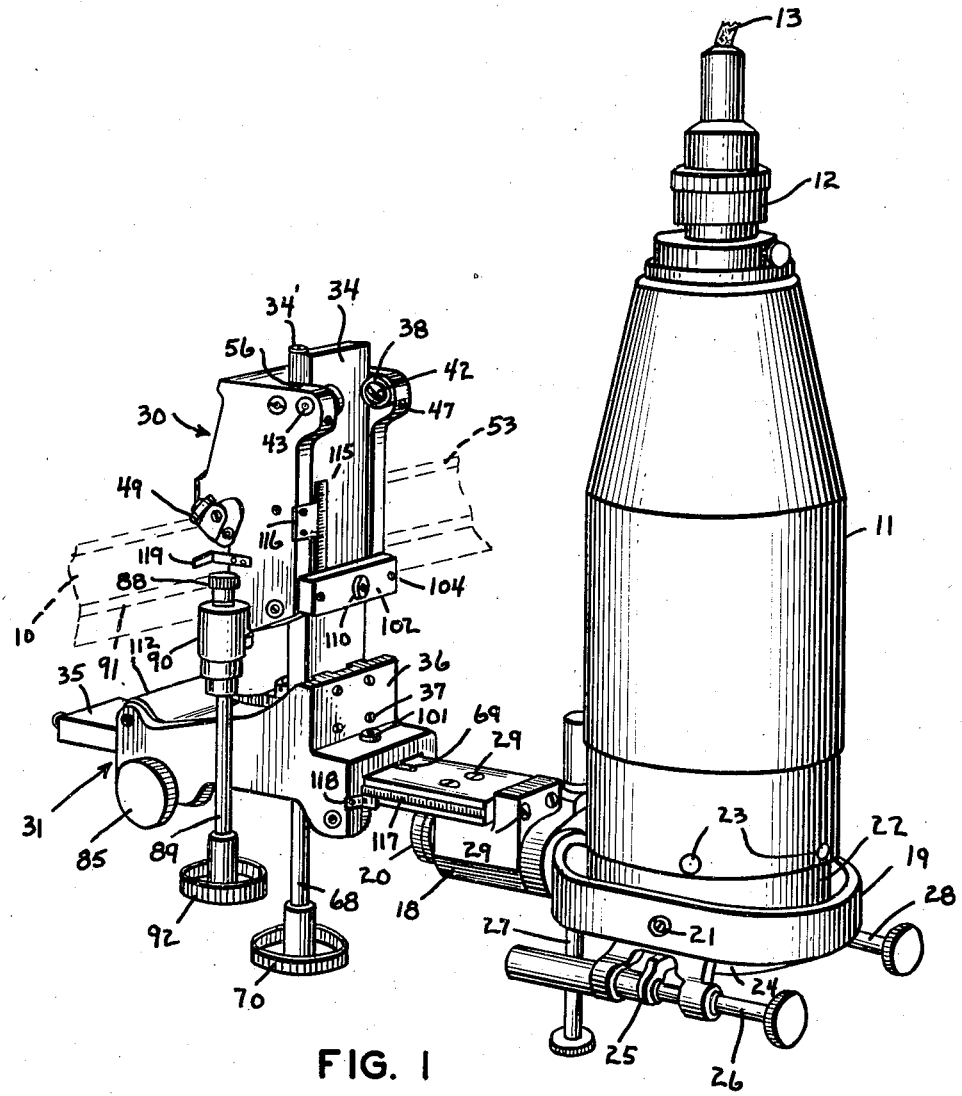
Figure 1 is a perspective view of an optical instrument comprehended by my invention.
Figure 2:
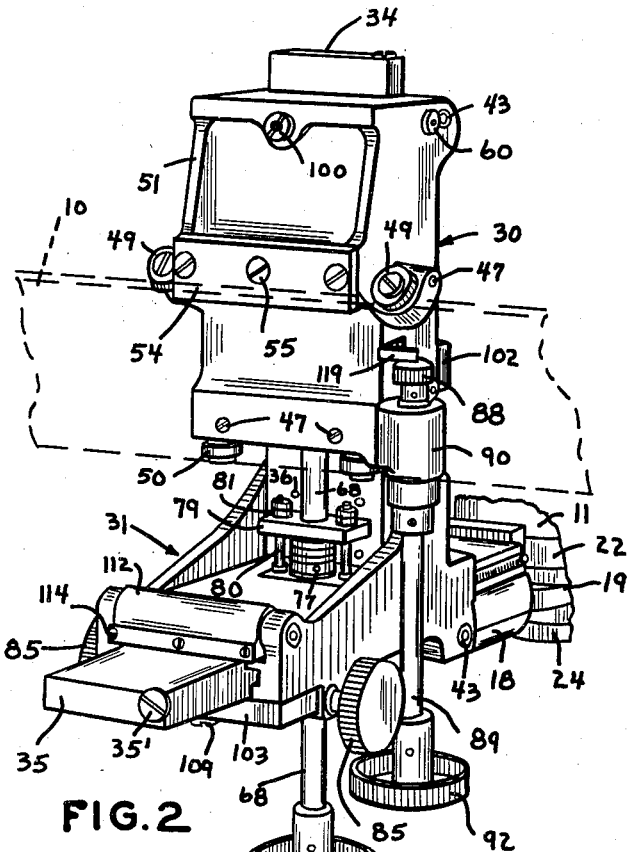
Figure 2 is another perspective view of the instrument shown in Figure 1 with the housing for the optical system broken away.

In Figures 1 and 2 I have shown an optical instrument of the type characterized by having its optical system adjustable along several axes. For the purpose of illustration, this instrument has been disclosed as a projector although it is to be understood that my invention contemplates any form of instrument wherein the optics thereof are adjustably movable as a body for the purpose of locating them with reference to some spatial point or area positioned outside of the optical system and within the projection or observation field of the instrument. The instrument comprises a support 10, housing 11, an optical system within the housing and adjusting mechanism for positioning the housing and its optics, this mechanism being adapted to carry the housing 11 and to be secured to the support 10. Similar elements and components of the parts forming the instrument are indicated by like reference numerals in the different views of the drawings.

Figure 3:
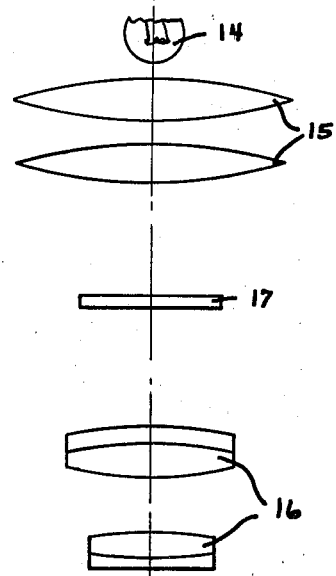
Figure 3 is a schematic view of an optical system adapted to be employed with the instrument.

As shown in Figure 1, the housing 11 has a lamp socket 12 extending within the upper portion thereof for supporting a light source therein. A suitable lead cable 13 connects the socket 12 to an electric supply source. One form of optical system for use with the instrument is shown in Figure 3 and consists of the light source 14, condensing lenses 15 and projection lenses 16. A transparency slide holder 17, adapted to be removably mounted in the usual slot (not shown) in the housing, is provided to permit a transparency to be positioned between the condensing and the projection lenses of the system. All of the elements of the optical system are carried in suitable mounts which are secured within the housing 11 by conventional construction practices. A system of this nature is well known to the art as a means for projecting an image of a transparency. It is to be understood, however, that variation of the optical system to meet purposes other than that of providing a projection system is within the scope of the invention.

Any conventional type of mounting may be employed for securing the housing 11 to one of the slides of the adjusting mechanism. One suitable mounting or connection means permits the housing to be rotated about the optical axis of the optical system and to be tipped and tilted about axes which are normal thereto and which are also normal to each other. To this end I have shown in Figures 1 and 2 a housing mount having a bearing block 18 which rotatably supports a shaft having a mounting ring 19 formed thereon. The just mentioned shaft is retained in its bearing by means of retaining nuts 20 engaged to its end opposite the ring 19. Gimbals 21, extending through the mounting ring 19 normal to its axis of rotation, pivotally support an intermediate ring or collar 22 within the ring 19. Rotatably journaled in the ring 22 is a sleeve (not shown) having a seat (also not shown) to which the housing 11 for the optical system is detachably secured by means of fastenings 23.

The just mentioned rotatable sleeve carries a swing collar 24 which is provided with an arm 25 connected to conventional fine adjustment means 26, supported on the ring 19, for rotating or swinging the housing about the optical axis. Means engaging the collar 22 for tipping the housing about the gimbals 21 is indicated by the numeral 27 while tilt adjusting means for tilting the ring 19 is designated by 28. Screws 29, shown in Figure 1, are used for securing the housing mounting to a slide of the adjusting mechanism.

As previously noted, the housing mounting is of a conventional design. If desired, a mount may be employed which rigidly secures the optical system housing to the adjusting mechanism. Obviously the type of housing mounting employed will be influenced by the function of the instrument with which it is used. It has been shown in the described form to illustrate the possibility of obtaining secondary adjustment means for the optics of the instrument in addition to that afforded by the adjustment mechanism to be immediately detailed.

Figure 4 shows in detail a means for adjusting the position of the housing 11 and its optical system which employs a pair of similar slide blocks 30 and 31. Slide block 30 is slidably mounted upon the support 10 which may be in the form of a rigid bar or bracket maintained in a suitable position to permit the instrument to work a desired field. Both slide blocks 30 and 31 are respectively provided with channels 32 and 33 in which the slides 34 and 35 are respectively slidably mounted between rollers to be shortly described. These rollers have their axes adjustably movable towards and away from their respective slides whereby to permit the slides to be trued to their desired angular relation.

The slide block 30 is adapted to carry the slide block 31. For this purpose the slide 34 is secured by fastenings 36 to an upright leg 37 projecting from the slide block 31 substantially normal to its channel 33 while the two slide blocks are themselves connected by a threaded shaft construction to be hereinafter explained. The housing 11 is carried by the slide 35 and has the bearing 18 of its mounting structure secured to the slide by the fastenings 29 already described.

As mentioned, the slides are mounted between rollers which are in bearing contact with each slide. For this purpose a pair of rollers is carried by each slide block near each of its ends. Each roller of each pair is located on the same side of a slide adjacent its edge. However, the pairs of rollers are so arranged that they are on opposite sides of their respective channels. Thus a pair of rollers 38 is mounted at one end of the slide block 34 while a second pair of rollers 40 is mounted at its other end to contact the slide on its side away from the rollers 38. Pairs of rollers 39 and 41 at opposite ends and on opposite sides of the channel 33 are used to provide a similar floating mount for the slide 35.

Figure 7:
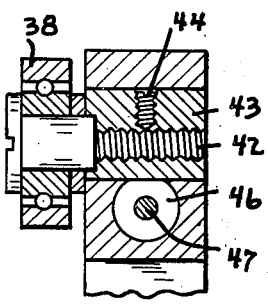
Figure 7 is a sectional view of an adjustable roller taken on the line 7—7 of Figure 4.

Each of the rollers is rotatably mounted on its slide block by a similar construction expedient which is illustrated in Figures 4 and 7 for a roller 38. As therein shown, the roller 38 is loosely mounted on a threaded stud 42 adapted to engage a threaded bushing 43 journaled in one of a pair of aligned bearing openings extending through opposite faces of the slide block 30. The stud and bushing are secured to each other by a set screw 44 and the stud is provided with a slotted head to facilitate the eccentric adjustment of the roller.

Means for locking the roller in an adjusted contact position comprises clamps 45 and 46 mounted in a suitable bore which is normal to and which opens into the bearing opening for the eccentric bushing 43. A screw 47 extends freely through the clamp 45 and is engaged with the clamp 46 which is threaded. The clamps 45 and 46 are of a suitable shape so that tightening of the screw 47 will draw them together and cause the bushing 43 to be locked in an adjusted position while loosening of the screw will permit separation of the clamps so that the eccentric bushing may be adjusted as desired.

Slide rollers 38 and 39 are locked in their adjusted positions by the clamp construction just described. The design of the slide blocks makes it desirable, in order to facilitate adjustment of the eccentrics, to use a slightly modified locking means for the eccentrics of the rollers 40 and 41. This construction merely consists of a set screw 48 which as shown in Figure 4 is threaded into each slide block to engage the eccentric bushings of the rollers 40 and 41.

Use is made of pairs of rollers 49 and 50 carried on the abutments or projecting portions 51 and 52 of the slide block 30 for slidably mounting this block on the support 10 and for permitting its adjustment so as to true its slide with the support in a manner which will later appear. These rollers 49 and 50 are rotatably mounted by an eccentric bushing construction like that heretofore described and are held in their adjusted positions by the locking clamp means used with the slide rollers 38. Rollers 49 contact and are supported on the beveled edge 53 of the support 10 while rollers 50 bear against a face of the support. A gib or retaining bar 54, secured to the abutments 51 by screws 55 cooperates with the rollers 49 and 50 to slidably hold the slide block 30 on its support 10.

Figure 5:
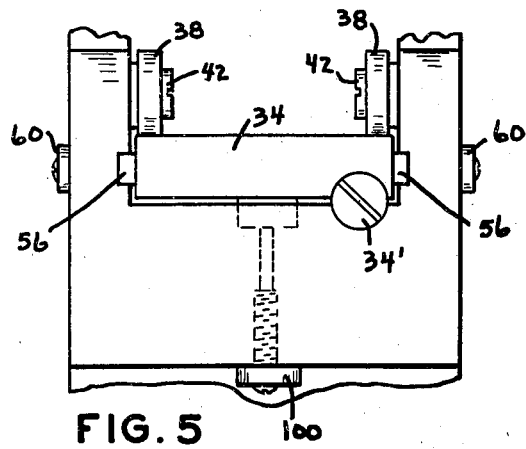
Figure 5 is a partial plan view of Figure 4.

A longitudinal bearing for each edge of the slide 34 is provided by a gib 56 held in a recess in each side of the channel 32 of the slide block 30. This construction is disclosed in Figures 4 and 5 wherein each gib 56 is shown as held in its recess by a retaining screw 58 which extends through the wall of the slide block. Adjusting screws 60 located near each end of the slide block and also extending therethrough are employed as gib adjusting means. A similar bearing, but only for one edge of the slide 35, is provided by the gib 57 held in a recess in the slide block 31 by a retaining screw 59 and is adjusted by screws 61. The gibs 56 and 57 afford a means, which will presently be explained, for truing and holding the slides so that their longitudinal axes are in their desired angular relation.

It may be observed in Figure 4 that the channel 32 in the slide block 30 opens into a cutaway portion 62 in the slide block casting. The cutaway portion 62 partially extends through the slide block 30 in a lengthwise direction thereof from the end of the block adjacent the rollers 40 to a position near the opposite end thereof which is somewhat below the rollers 38. Advantage is taken of this design to provide the threaded shaft connection, heretofore mentioned, between the two slide blocks. To this end a bracket 63 is mounted within the cutaway portion 62 of the slide block 30 by screws 64 which engage the body of the slide block. Bracket 63 is provided with a recess or socket adapted to support a swivel nut in the form of a ball 65 which is held therein by a recessed cover member 66 secured to the bracket by screws 67.

The connection between the slide blocks is effected by a shaft 68 which is rotatably supported on the slide block 31. This shaft extends through the slide block 31 and through a slot 69 in the slide 35 and has its lower end provided with an operating knob 70. Shaft 68 projects above the slide block 31 within the cutaway portion 62 and is provided with a threaded portion 71 which extends through and is engaged with a threaded passage in the ball 65. A suitable slot is formed in the surface of the ball 65 for engagement with the head of a screw 72 secured to the bracket 63 so that the ball may be prevented from rotating with the shaft 68 when the latter is turned on operation of the hand knob 70.

In rotatably supporting the shaft 68, use is made of a swivel or thrust bearing shown in detail in Figure 4. This bearing comprises upper and lower ball races 73 between which is the ball retaining ring 74 carrying the usual ball bearings 75, a collar 76 pinned to the shaft just adjacent the lower ball race by a pin 77 and the upper and lower ball segments or spherical headed members 78, which latter are loosely mounted upon the shaft to form the ends of the swivel bearing. The lower ball segment 78 is seated in a spherical recess formed in the upper surface of the slide block 31 while the upper ball segment of the bearing is engaged by a spherical recess in a retainer plate 79 loosely mounted on the shaft 68.

Plate 79 is provided with openings at its ends through which studs 80, threaded into the upper surface of the slide block 31, are adapted to extend. These studs 80 are threaded to receive suitable nuts 81 for holding the bearing elements in assembled condition and the ball segments 78 in their seats. It will be appreciated that the slide block 30 supports the slide block 31 by reason of the swivel connection means just disclosed. At the same time the threaded shaft connection affords a means for raising and lowering the slide block 31 and its slide which carries the housing 11 inasmuch as rotation of the shaft 68 and its screw will move the slide blocks with respect to each other to vary the distance between them. An important feature of this construction resides in the swivel shaft bearings for shaft 68 which automatically permit this shaft to align itself for any adjustment of the bearing rollers by their eccentrics. Obviously this self aligning characteristic of the shaft 68 will prevent its binding.

Means for moving the slide 35 relative to its slide block 31 includes a rack 82 carried on the underside of slide 35 and a pinion 83 which cooperates with the rack and is fixed to a pinion shaft 84 provided with removable hand operating knobs 85. The knob 85 on the front side of Figure 4 has been removed so as to clearly show the mounting for the shaft 84 which is positioned transversely of the slide 35 and is rotatable in eccentric bushings 86 journaled in projecting portions of the slide block below the slide 35. Each eccentric bushing 86 is provided with a saw cut, shown in Figure 4, to permit the adjustment of the position of the bushing when its adjacent knob 85 is removed from the shaft 84. Locking means for each bushing 86 is generally indicated by the numeral 87 and is substantially similar to the clamp structure 45 and 46 heretofore described in connection with Figure 4.

By mounting shaft 84 in eccentric bushings I am enabled to adjust the position of the shaft to compensate for any adjusted position of the slide 35 between its bearings 39 and 41 and thus assure easy operation of the slide. Also this eccentric mounting of the pinion shaft 86 provides a wear adjustment for the rack and pinion drive for the slide 35. It will be apparent that rotation of the shaft 84 in a suitable direction will cause desired longitudinal movement of the slide 35 between its bearings and consequently movement of the housing 11 in a similar direction. The movement of the slide 35 is limited by a stop screw 35' engaged with the free end thereof to prevent the slide from losing contact with the rollers 41. A similar stop screw 34' is provided on the slide 34 and is also adapted to contact its slide block to limit the movement of its slide.

As previously pointed out the slide block 30 is movable on its support 10. The means for adjusting its position on the block includes a pinion 88 fixed to a shaft 89 rotatably supported by a bearing assembly 90 carried on a side of the slide block 30. Rack teeth 91 are provided on the support 10 for engagement with the pinion 88. It will be apparent that upon rotation of the shaft 89 by the hand knob 92, which latter is detachably fixed to the shaft 89, that the slide block 30 and hence slide block 31 connected thereto will be moved in a direction which is longitudinal of the support 10.

From an inspection of Figure 4 and with a consideration of the assembled instrument as shown in Figures 1 and 2, it will be appreciated that the moment on the slide 35 created by the weight of the housing 11 and the optical system will tend to move this slide and its block 31 in a counterclock direction about the rollers 39 as a pivot. However, such movement of the slide 35 is restrained by the rollers 41 so that the only result is to firmly hold the slide in contact with its rollers 39 and 41.

This counterclock turning movement is transmitted to the slide 34 and tends to pivot it about the rollers 40. As in the case of the other slide, however, slide 34 is merely pressed against the rollers 38 located on its side and its end opposite the rollers 40. Thus when the instrument is in working condition, both slides will be supported between their respective rollers and maintained within their channels.

It may be observed, however, that any force applied to the slides in a direction opposite to that created by the weight of the housing 11 and its optics will tend to move the slides out of their respective channels 32 and 33. To prevent any accidental displacement of the slides from their operating positions as well as to facilitate handling of the slide mechanism during assembly, disassembly and transportation of the instrument, I employ contact members or disks 94 and 94′ and 95 and 95′ located, respectively, near the ends of the slide blocks 30 and 31 adjacent the slide rollers for the slides 34 and 35. These contact members are located on opposite sides of each slide and opposite the center line of each slide, a single contact member being shown at each end of the slide blocks.

Contact members 94 and 95 are respectively mounted in recesses 96 and 97 in the slide blocks 30 and 31. These recesses open into the channels for the slides 34 and 35. Adjusting screws 98 and 99, threaded into the slide blocks, respectively hold the contact members 94 and 95 against their corresponding slides. Screws 98 and 99 are each provided with ball ends which seat in a cupped portion in their respective contact members so that the latter are pivotally connected to the screws. Lock nuts 100 and 101 are provided for securing the screws 98 and 99 in adjusted positions.

Contact members 94′ and 95′, located adjacent the open faces of the slide blocks, are respectively mounted in cross bars 102 and 103 secured to the slide blocks by suitable fastenings, such as the screws 104 shown in Figure 1. Cross bars 102 and 103 are respectively provided with recesses 106 and 107 for their contact members which are pivotally held against their corresponding slides by ball ended adjusting screws 108 and 109, the latter being provided with lock nuts 110 and 111. The contact members are adjusted to just barely touch their slides when the instrument is in working condition by contact which is so light that friction developed between them and the slides on the movement of the latter may be considered as negligible.

The construction which I have disclosed provides a means for moving and positioning the housing of the instrument along any one of three coordinate axes. If these axes are chosen at right angles to each other and if the support 10 be considered as the X axis of the coordinates, it becomes necessary to maintain the slide 34 so that its longitudinal and transverse axes are respectively perpendicular and parallel to the longitudinal axis of the support 10. At the same time a similar relation will exist between the slides 35 and the support 10, where a right angle coordinate system is employed, but in this instance the longitudinal and transverse axes will be respectively normal and parallel to similar axes of the slide 34. Also if the support 10 is positioned horizontally, then the slide 35 will move in a horizontal plane along a Y axis which is transverse to the support 10 while the slide 34 will move in a vertical plane along a Z axis and both slides will move along the horizontal X axis of the support.

These just described conditions may be fulfilled by only roughly finishing the slide blocks 30 and 31. This is due to the adjustability of the rollers for the slides 34 and 35 and also of the rollers on the block 30. In fact, each slide block is formed of a single casting and no attempt is made to provide it with an accurate finish beyond such grinding as may be required to give smooth and flat surfaces. However, the faces or sides and the edges of the slides are made parallel to each other within reasonable limits which are finer than the requirements for the slide blocks although an extremely fine degree of accuracy is not required in finishing the slide surfaces. A similar degree of accuracy is required for the flatness of the faces and the bevel of the support, the angle of the bevel and for the various gib surfaces as well as for the concentricity and the diameter of the rollers.

That I am enabled to very accurately adjust and maintain the slides in the desired angular relation while eliminating much tedious and costly machining of both the blocks and the slides will be apparent from the many possible adjustments of the eccentrically mounted rollers. As the position of the support 10 is fixed, it may be used as a reference or base bar to which all adjustments are made.

The support 10 has been shown as horizontal so that when the slide and block means or adjusting mechanism is mounted thereon by engaging the support gib 54 therewith, the slide 34 may readily be made vertical by manipulation of the eccentrics of the rollers 49 and 50.

For example, suitable adjustment of an eccentric bushing of one of the rollers 49 will cause the block 30 to pivot on the edge of the bevel 53 about the other roller 49 in contact with the bevel so that the transverse axis of the slide 34 may be made horizontal. Adjusting movement of this nature may be thought of as raising or lowering one edge of the slide 34 while holding the other edge against movement. Of course the same effect as that described may be obtained by simultaneously adjusting the eccentric of each roller 49 by suitable amounts in opposite directions to each other.

It is to be noted that the slide mechanism is so constructed that, if desired, rollers 49 may be used to very accurately adjust the transverse axis of slide 34 with the horizontal. Usually rollers 49 are employed for an approximate adjustment of this nature where slide 34 has two gibs as in Figure 5. In such a case, the transverse axis of slide 34 is usually accurately trued to the horizontal by use of the gibs 56.

Slide 34 will have a tendency to square itself when slide block 30 is mounted on the support 10 so that the sides of the slide will lie in planes which are parallel to a vertical plane passing through the X axis of the coordinate system, that is to say, through the longitudinal axis of the support 10. This is due to the form of mount for the block 30 which uses bevel 53 and gib 54 in carrying the block from the support 10. Movement of rollers 50 into even contact with the face of the support 10 will permit the slide 34 to be approximately squared with the vertical, it being noted that when the transverse axis of slide 34 has been trued as already described that simultaneous adjustment of rollers 50 in a like direction may be utilized to true the longitudinal axis of the slide with the Z axis of the coordinate system.

In effecting any of the above adjustments and in fact in adjusting any roller on the instrument, locking means 47 or 48 is loosened to permit the head of a stud 42 to be turned to position its eccentric bushing 43 and roller, after which the locking means is relocked to hold the roller in its adjusted position.

Where the slide 34 is brought into approximate adjustment in the manner described, it may be accurately trued for normal operation through use of the rollers 38 and 40 and the gibs 56 on the block 30. Tipping of the slide 34 may be obtained by suitable adjustment of the gibs 56 through their adjusting screws 60 although it will be understood that if it is unnecessary to use the gibs for this purpose, they need be adjusted only into supporting contact with the edges of the slide. Tilting adjustment of the slide 34 about either pair of rollers 38 or 40 may be obtained by the suitable adjusting movement of the other of these pairs of rollers. Adjusting movement of the slide 34 about its longitudinal axis may also be made by moving one of the rollers 38 and a roller 40, which is diagonally opposite the former, towards the face of the slide while moving the other roller 38 and 40 away from the slide. Similarly the slide 35 may be squared so that its faces are accurately perpendicular to the slide 34 by suitable use of the opposed pairs of rollers 39 and 41 which support the slide 35 and by the adjustment of the gib 57.

I have found that with the means which I have disclosed, I am enabled to quickly and easily square the slide 34 to the support 10 within an angular accuracy of five minutes and that I can likewise square both slides with respect to each other with an equal degree of accuracy. In effecting these working adjustments, the support 10 may be used as a reference from which the slides may be set. Suitable gauges and other measuring instruments may be used, in a manner well known to the art, to assist in setting the slides and to determine when they have been adjusted to their angular working relation. It should be noted that the self aligning feature of the shaft 68 makes it possible to set the slides as described while the eccentric mounting means for the pinion 84 permits the operating means for the horizontal slide 35 to compensate for its movement when it is set in its working relation to the vertical slide.

The vertical slide 34 and the under side of the horizontal slide 35 may be expected to remain substantially free of dust. However, if desired, a dust wiper mechanism may be employed to prevent undue accumulation of dust and dirt on the upper face of the slide 35. This mechanism, which can also be associated with each face of each slide if desired, comprises the cover 112 and felt wiper 113 secured thereto by screws 114 which latter fasten the cover to the end of the slide block 31 in the manner shown in Figure 4 with the wiper in contact with the upper face of the slide 35.

As already noted, actuation of the operating knobs 70, 85 and 92 will cause desired movement of the slides 34 and 35 and their slide blocks with the result that the housing 11 and its optics will be moved along the X, Y and Z axes of the described coordinate system. This movement may be by an amount which is predetermined, as, for example, by some set of coordinates for the system so as to position the optics of the instrument at some predetermined location or the movement may be by some undetermined amount as from some known location to some other location, the coordinates of which are unknown. To assist in positioning the housing as well as to determine the linear value of its movement along any of the axes, a scale and index are associated with each axis of the coordinate system.

For example, a scale 115 is secured by screws to a face of the vertical slide 34 and cooperates with an index 116 fastened to the block 30 in the manner shown. Another scale 117, screwed or otherwise carried on the edge of the horizontal slide 35, is adapted to cooperate with another index 118 suitably mounted on the block 31 while still another index 119 is fastened to the block 30 for cooperation with a suitable scale (not shown) which is provided on the face of the support 10 adjacent the slide block 30. It may be observed that as the scale 117 is carried on the edge of the slide 35 that only one gib 57 is provided in the slide block 31.

In use, the housing of the instrument which I have shown is set in the manner indicated at some location from which it is desired to project an image and the projection system is put into operation for this purpose. Having located the housing, it may, if desired, be further adjusted while being maintained at this location by suitable actuation of the tip mechanism 27, tilt mechanism 28 and the swing adjusting means 26 for rotating the housing. In moving the housing to some desired location or from one location to another, proper use is made of the hand knobs 70, 85 and 92, the amount of movement of either slide or of the slide blocks being determined by reference to the proper indices and scales. While my invention has been described in connection with an instrument for projecting an image, it is to be again observed that it is adaptable for other purposes. In this connection it can be readily employed as an illuminator or as a projector lamp and is well adapted for use with may types of observation instruments such, to name only one for example, as a microscope.

An important feature of the invention resides in the effective means for substantially eliminating so called break-out friction of the slides, that is to say, the friction which must be overcome in moving a slide which is at rest. This is made possible by mounting the slides between rollers so that what friction there is between the slides and their support is of a rolling type and will be negligible. Other results of this expedient is to provide an ease of operation of the slides not ordinarily obtainable with slides of the prior art and to permit delicate adjustment of the housing and its optics of a nature similar to that obtained with the use of a slow motion or fine adjustment mechanism.

While the slides and the support have been shown at right angles to each other, it will be appreciated that practice of the invention is not limited to this particular angular relation of these parts. Obviously, slight constructional changes may be made in the slide block and slide mechanism whereby to support the slides in many different angular relations so as to permit movement of the housing for the optics along different axes from those employed in the coordinate system used to illustrate my invention. Likewise, while the support 10 has been shown as horizontal, the invention comprehends its location so that its longitudinal faces are inclined to a horizontal and/or to a vertical plane and to this end includes means for suitably adjusting the support.

From the foregoing, it will be appreciated that in attaining the aims and objects of my invention, I have provided a novel instrument of simple design and easy operation due to the particular slide mechanism associated therewith. At the same time the construction which I employ makes it possible to eliminate much costly machining of parts with a consequent reduction in production costs.

I claim:

1. An optical instrument having a support, a slide block engaged with said support, a slide movable in said block, a second block secured to said slide, a second slide movable in said second block, adjustably movable means supporting the second block from the first block whereby to move said second block and the first slide to a desired position, drive means carried by said second block operatively connected to driven means carried by said second slide whereby to move said second slide to a desired position, a housing for an optical system, an optical system within said housing, said housing for the optical system secured to said second slide, and adjustable bearing means located on both of said blocks at one of their respective ends on one side of each of said slides and at their opposite ends on the opposite side of said slides whereby to movably support each slide and permit angular adjustment of the slides with respect to each other.

2. An optical instrument comprising a support, a housing, an optical system within said housing and a slide mechanism engaged with the support and carrying said housing and optical system, said slide mechanism having a plurality of slides and slide blocks, said sides arranged in a predetermined angular relation to each other and each movable in a separate slide block, one block engaged with said support and having its slide connected to a second block and connected itself to said second block by separate and movable connection means whereby to move the slide of the first block to a desired position, movable means carried by said second block cooperatively connected to its slide for moving the same to a desired position, said housing for the optical system secured to the slide of the second block, and adjustable means movably supporting and maintaining said slides in their angular relation to each other having bearings and gibs adjustable towards and away from said slides, said bearings carried by said blocks at one of their respective ends on one side of each of said slides and at their opposite ends on the opposite side of said slides, said gibs located along an edge of each slide and each supported on a block to have its ends free for adjusting movement.

3. An optical instrument comprising a housing, a support for the housing, an optical system within the housing and adjustable means carrying said housing from said support for positioning the housing and its optical system at a desired location, said means having a slide block engaged with said support, said block provided with a channel, a slide movable in said channel, a second slide block secured to said slide, said second block provided with a channel, a second slide movable in said last named channel, said second block supported from said first block by adjustable connection means for moving the second block and first slide to a desired position, movable means carried by said second block cooperating with said second slide for moving the second slide to a desired position, said housing for said optical system secured to said second slide, bearing means carried by eccentrics adjustably movable towards and away from each slide and mounted in said blocks adjacent the respective ends thereof on opposite sides of each of said slides whereby to movably support the slides and to permit angular adjustment of the slides with respect to each other.

4. An optical instrument comprising a support, a slide block engaged with said support, a slide movable in said block, a second slide block secured to said slide, a second slide movable in said second block, a housing for an optical system, an optical system within said housing, said housing for the optical system secured to said second slide, said second block connected to said first block by adjustable connection means for moving the second block and the first slide to a desired position, rotatable means carried by the second slide and operatively connected to the second slide for moving said second slide to a desired position, said slides movably supported between bearing means having rollers in contact with the slides, shafts for said rollers, each roller rotatable on a separate shaft, and eccentric bushings each supporting a shaft, each bushing adjustably carried in a slide block to move its roller towards and away from its respective slide.

5. In an optical instrument the combination of a housing for an optical system, an optical system within the housing, a support for the housing and movable means for securing the housing to its support whereby to position said housing and its optical system at a desired location, said means comprising a slide block engaged with said support, a slide movable in said block, a second slide block, a second slide movable in said second block, said housing for the optical system secured to said second slide, each slide movably supported between bearing means adjustable towards and away from each slide and carried by each block near one of its ends on one side of its slide and also carried near the opposite end of each block on the opposite side of its slide, said second block and second slide provided with openings, a shaft having a threaded portion, said shaft extending through said openings, swivel means on said second block rotatably supporting said shaft, threaded swivel means carried by said second block and engaged by the threaded portion of said shaft, and cooperating rack and pinion means carried respectively by said second slide and second block.

6. An optical instrument comprising a support, a slide mechanism supporting an optical system of the instrument for movement in different planes and having a slide block movable on said support, a slide movable in said block in a plane different from the plane of the support, a second slide block connected to said slide, adjustably movable means supporting the second block from the first block whereby to move the second block and the first slide to a desired position, a second slide movable in said second block in a plane different from the plane of the movement of the first slide, a housing, an optical system within the housing, said housing and optical system carried by the second slide, separately operated means associated with said first block and support and with said second block and second slide whereby to respectively move said first block and said second slide to desired positions, and adjustable gib means mounted on both of said blocks along an edge of each slide and adjustable roller means mounted on each block at an end thereof on a side of each slide and at the opposite end of each block on the opposite side of each slide whereby to movably support each slide and to adjust and hold the slides in a predetermined angular relation to each other and to said support.

7. An optical instrument comprising a support, a slide mechanism supporting an optical system of the instrument for movement in different planes, said slide mechanism having a slide block slidable on said support, a slide movable in said block in a plane different from the plane of the support, a second slide block connected to said slide, rotatable means supporting the second block from the first block whereby to move the second block and first slide to a desired position, a second slide movable in said second block in a plane different from the plane of the movement of the first slide, a housing carried by the second slide, an optical system within said housing, separately operated means associated with the first block and said support and with said second block and second slide whereby to respectively move said first block and second slide to desired positions, rollers contacting said slides and located near one end of both said blocks on one side of each slide and also located near the opposite end of each block on the opposite side of each slide, other rollers contacting said support and located near the opposite ends of said first block on the side thereof adjacent said support, and means rotatably supporting said rollers on said blocks for adjusting their contacting positions with respect to said slides and said support.

8. An optical instrument comprising a housing, an optical system within the housing and slide mechanism carrying said housing from said support for moving the housing and the optical system along any one of the axes of a coordinate system wherein said support forms one of said axes, said mechanism having a slide block movable on said support, a slide member movable in said block along a second axis of said system, a second block connected to said slide, rotatable means supporting the second block from the first block whereby to move said slide along said second axis, a second slide movable in said second block along a third axis of said system, said housing secured to said second slide, separately operated means associated with said first block and support and with said second block and second slide whereby said first block and said second slide may be respectively moved to desired positions on said support and along said second axis, gib means carried by the slide blocks in adjustable contact with an edge of each slide and roller means carried by the slide blocks in adjustable contact with the sides of the slides and a side and an edge of said support whereby to adjust and maintain said slides and support in an angular relation to each other which corresponds to the angular relation between the axes of said coordinate system.

HENRY F. KURTZ.